(12) United States Patent
Beausoleil et al.

(10) Patent No.: US 10,261,256 B2
(45) Date of Patent: Apr. 16, 2019

(54) LASER-WRITTEN OPTICAL ROUTING SYSTEMS AND METHOD

(71) Applicant: HEWLETT PACKARD ENTERPRISE DEVELOPMENT LP, Houston, TX (US)

(72) Inventors: Raymond G Beausoleil, Seattle, WA (US); Marco Fiorentino, Mountain View, CA (US); Jason Pelc, Palo Alto, CA (US); Charles M Santori, Palo Alto, CA (US); Terrel L Morris, Garland, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/546,283

(22) PCT Filed: Jan. 28, 2015

(86) PCT No.: PCT/US2015/013306
§ 371 (c)(1),
(2) Date: Jul. 25, 2017

(87) PCT Pub. No.: WO2016/122490
PCT Pub. Date: Aug. 4, 2016

(65) Prior Publication Data
US 2018/0024292 A1   Jan. 25, 2018

(51) Int. Cl.
*G02B 6/12* (2006.01)
*G02B 6/13* (2006.01)
(Continued)

(52) U.S. Cl.
CPC ............... *G02B 6/13* (2013.01); *G02B 6/00* (2013.01); *G02B 6/122* (2013.01); *G02B 6/14* (2013.01);
(Continued)

(58) Field of Classification Search
CPC ................... G02B 6/13; G02B 6/122
See application file for complete search history.

(56) References Cited

U.S. PATENT DOCUMENTS

| 450,412 A | 4/1891 | Knight |
|---|---|---|
| 4,504,121 A | 3/1985 | Carlsen et al. |

(Continued)

FOREIGN PATENT DOCUMENTS

| EP | 2112790 A1 | 10/2009 |
|---|---|---|
| JP | 2008-514997 A | 5/2008 |

(Continued)

OTHER PUBLICATIONS

Martynas Beresna, "Ultrafast Laser Direct Writing and Nanostructuring in Transparent Materials," Advances in Optics and Photonics 6.3, Aug. 15, 2014, pp. 293-339, http://www.researchgate.net/profile/Martynas_Berssne/publications/264798279_Ultrafast_laser_direct_writing_and_nanostructuring_in_trasnparent_materials/links/543400130cf2bf1f127ae81.pdf.

(Continued)

*Primary Examiner* — Sung H Pak
(74) *Attorney, Agent, or Firm* — Tarolli, Sundheim, Covell & Tummino L.L.P.

(57) ABSTRACT

One example includes an apparatus that includes a plurality of input/output (I/O) ports and a body portion. The plurality of I/O ports can be arranged at a plurality of peripheral surfaces of the body portion. The body portion includes a solid dielectric material having a substantially constant index of refraction. The body portion also includes parallel planar surfaces spaced apart by and bounded by the plurality of peripheral surfaces. The solid dielectric material in the body portion can be writable via a laser-writing process to form an optical waveguide extending between a set of the plurality of I/O ports.

6 Claims, 4 Drawing Sheets

(51) Int. Cl.
| | |
|---|---|
| *G02B 6/26* | (2006.01) |
| *H04B 10/80* | (2013.01) |
| *G02B 6/122* | (2006.01) |
| *G02B 6/14* | (2006.01) |
| *G02B 6/28* | (2006.01) |
| *G02B 6/00* | (2006.01) |

(52) U.S. Cl.
CPC ............. *G02B 6/26* (2013.01); *G02B 6/2804* (2013.01); *H04B 10/801* (2013.01)

(56) References Cited

U.S. PATENT DOCUMENTS

| | | | |
|---|---|---|---|
| 4,988,157 A | 1/1991 | Jackel et al. | |
| 5,037,179 A | 8/1991 | Bortolin et al. | |
| 5,268,981 A | 12/1993 | Shahid | |
| 5,717,803 A | 2/1998 | Yoneda et al. | |
| 5,786,560 A * | 7/1998 | Tatah ................ | B23K 26/0604 219/121.77 |
| 5,960,131 A | 9/1999 | Fouquet et al. | |
| 6,055,344 A | 4/2000 | Fouquet et al. | |
| 6,134,369 A * | 10/2000 | Kurosawa ............. | B82Y 20/00 385/129 |
| 6,154,586 A | 11/2000 | MacDonald et al. | |
| 6,164,837 A | 12/2000 | Haake et al. | |
| 6,345,132 B1 | 2/2002 | Picard et al. | |
| 6,356,679 B1 | 3/2002 | Kapany | |
| 6,366,715 B1 | 4/2002 | Wang et al. | |
| 6,374,020 B1 | 4/2002 | Paniccia | |
| 6,396,972 B1 | 5/2002 | O'Rourke et al. | |
| 6,463,192 B1 | 10/2002 | Kapan | |
| 6,487,333 B2 | 11/2002 | Fouquet et al. | |
| 6,617,568 B1 * | 9/2003 | Matsuda ......... | H01L 31/035281 250/214 R |
| 6,690,845 B1 | 2/2004 | Yoshimura et al. | |
| 6,711,315 B1 | 3/2004 | Joseph et al. | |
| 6,768,830 B1 | 7/2004 | Lacey et al. | |
| 6,882,769 B1 | 4/2005 | Maitan | |
| 6,895,139 B2 | 5/2005 | Schwiebert et al. | |
| 6,915,032 B1 | 7/2005 | White et al. | |
| 7,541,058 B2 * | 6/2009 | Chan .................... | G02B 6/1221 385/129 |
| 7,623,743 B2 * | 11/2009 | Furuyama ............ | G02B 6/4221 385/14 |
| 7,653,272 B2 | 1/2010 | Cham et al. | |
| 7,713,767 B2 * | 5/2010 | Chan .................... | G02B 6/132 257/E21.598 |
| 8,113,724 B2 * | 2/2012 | Terada ................. | G02B 6/4202 257/98 |
| 8,120,450 B2 * | 2/2012 | Kondo ............... | G01R 31/2822 333/245 |
| 8,195,016 B2 | 6/2012 | Shacklette | |
| 8,270,792 B1 | 9/2012 | Ng | |
| 8,718,436 B2 | 5/2014 | Barnes et al. | |
| 9,442,251 B2 * | 9/2016 | Sakai ..................... | G02B 6/122 |
| 2002/0005574 A1 | 1/2002 | Zhou | |
| 2002/0039468 A1 | 4/2002 | Lin | |
| 2003/0002030 A1 | 1/2003 | Schroeder | |
| 2003/0021551 A1 | 1/2003 | Carpenter et al. | |
| 2005/0031265 A1 | 2/2005 | Simon et al. | |
| 2005/0276562 A1 | 12/2005 | Battey et al. | |
| 2006/0133718 A1 | 6/2006 | Liu | |
| 2006/0215954 A1 | 9/2006 | Jenkins et al. | |
| 2007/0060970 A1 | 3/2007 | Burdon et al. | |
| 2007/0258683 A1 | 11/2007 | Rolston et al. | |
| 2009/0002849 A1 | 1/2009 | Kim et al. | |
| 2009/0103861 A1 | 4/2009 | Presley et al. | |
| 2009/0304331 A1 | 12/2009 | Herman et al. | |
| 2010/0178007 A1 | 7/2010 | Thomson et al. | |
| 2010/0215317 A1 | 8/2010 | Rolston et al. | |
| 2011/0096778 A1 | 4/2011 | Binder | |
| 2012/0039567 A1 | 2/2012 | Herman et al. | |
| 2012/0072614 A1 | 3/2012 | Marr et al. | |
| 2012/0177381 A1 | 7/2012 | Dobbelaere et al. | |
| 2012/0207438 A1 | 8/2012 | Yu et al. | |
| 2012/0314382 A1 | 12/2012 | Wesselmann et al. | |
| 2012/0321309 A1 | 12/2012 | Barry et al. | |
| 2013/0058616 A1 | 3/2013 | Cote et al. | |
| 2013/0246990 A1 | 9/2013 | Yen et al. | |
| 2014/0112632 A1 | 4/2014 | Keenum et al. | |
| 2014/0179034 A1 | 6/2014 | Barwicz et al. | |
| 2014/0193116 A1 | 7/2014 | Bylander et al. | |

FOREIGN PATENT DOCUMENTS

| | | |
|---|---|---|
| TW | 201319890 A | 5/2013 |
| WO | WO-2014088980 A1 | 6/2014 |

OTHER PUBLICATIONS

Rafael Gattass, "Femtosecond Laser Micromachining in Transparent Materials," (Research Paper), 2008, pp. 219-225, http://www nature com/nphoton/journal/v2/n4/full/nphoton 2008 47 html.

Huan Huang, "Femtosecond Fiber Laser Direct Writing of Optical Waveguide in Glasses," SPIE Optical Engineering+ Applications, International Society for Optics and Photonics 2011 8 pages http://www.polaronyx.com/publications/Femtosecond_fiber_laser_direct_writing_in_glasses.pdf.

International Search Report & Written Opinion received in PCT Application No. PCT/US2015/013306, dated Oct. 26, 2015, 12 pages.

Graham Marshall, "Laser Written Waveguide Photonic Quantum Circuits," Optics Express 17.5, Jul. 20, 2009, pp. 12546-12554, http://web science mq edu au/~graham/publications/articles/marshall_oe_17-15_12546_2009.pdf.

Thomas Meany, "Optical Manufacturing: Femtosecond-Laser Direct-Written Waveguides Produce Quantum Circuits in Glass," Jul. 8, 2014, Laser Focus World, vol. 50, No. 7, 10 pages.

Rebeca Vazquez, "Integration of Femtosecond Laser Written Optical Waveguides in a Lab-on-Chip," Nov. 6, 2008, Lab on a Chip, 2009, vol. 9, pp. 91-96.

Amphenol Corporation, Fiber Management System, retrieved from Internet on Jul. 30, 2014, 22 pages. <http://www.amphenol-fiberoptics.com/assets/page/2f41ec14dbbbb8fb01576a89c8132509/Fiber%20Management%20Catalog.pdf>.

Ghafoor, A. et al., Architecture of an All-optical Circuit-switched Multistage Interconnection Network [online], Oct. 1990, Retrieved from the Internet <http://ieeexplore.ieee.org/xpl/articleDetails.jsp?tp=&arnumber=62837&matchBoolean%3Dtrue%26pageNumber%3D2%26searchField%3DSearch_All%26queryText%3D%28%28%28%%28%28optic*%29+AND+switch*%29+AND+parallel*%29+AND+input%29+AND+output%29 > [retrieved on Jul. 30, 2014].

Hunziker, W. et al., Low-loss, Self-aligned Flip-chip Technique forinterchip and Fiber Array to Waveguide Oeic Packaging, 1994, IEEE LEOS, pp. 269-270.

OZ Optics Company, Polarization Maintaining Fiber Pigtailed V-groove Assemblies [online], Mar. 19, 2002, Retrieved from the Internet <http://www.ozoptics.com/news/pr_113.html>.

PCT/ISA/KR, International Search Report, dated Jul. 24, 2015, PCT/US2014/061960, 14 pages.

PCT/ISA/KR, International Search Report, dated Jul. 28, 2015, PCT/US2014/062238, 15 pages.

PCT/ISA/KR, International Search Report, dated Jun. 30, 2015, PCT/US2014/061953, 3 pages.

Shi, Y. et al., Fabrication of High Precision Self-aligned V-grooves Integrated on Silica-on-silicon Chips, Jun. 15, 2014, Photonics Technology Letters, IEEE, vol. 26, Issue 12, pp. 1169-1171.

* cited by examiner

LASER-WRITTEN OPTICAL ROUTING SYSTEMS AND METHOD

BACKGROUND

Optical communications have become more prevalent as the demand for high-speed communication and processing has increased. Optical communications typically implement a laser and/or other optical devices for providing and receiving optical signals. Datacenter networks typically require the linking of optical cables (e.g., optical fibers) between optical devices, with the number of cables being potentially be very large (e.g., numbering in the thousands). Such an arrangement of a large number of optical cables can require optical shuffling or optical routing to interconnect a linear array of optical cables between input and output planes of a given computer or optical system.

DETAILED DESCRIPTION

Figure 1:
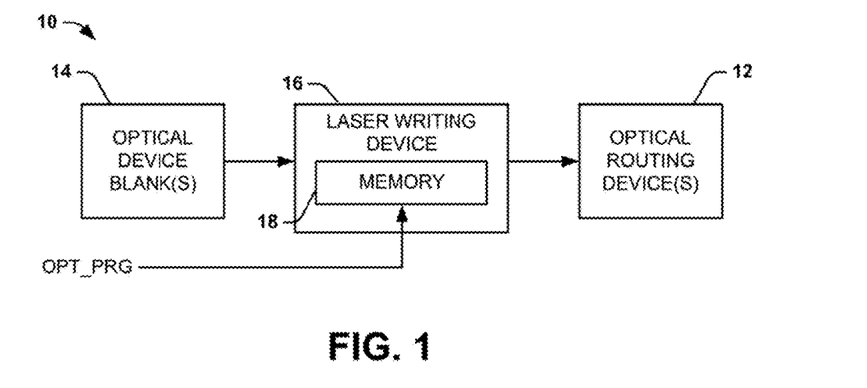
FIG. 1 illustrates an example of a laser-writing system.

FIG. 1 illustrates an example of a laser-writing system 10. As described herein, the laser-writing system 10 can be configured to fabricate one or more optical routing devices 12 from one or more optical device blanks 14 via a laser-writing device 16. As described herein, an optical device blank 14 refers to a stock component that can be mass-producible to be selectively configured as an optical routing device 12 having any of a variety of different predetermined optical routing configurations based on a laser-writing process. Therefore, the optical device blank 14 can be manufactured without any a priori known or predetermined routing configuration, such that the optical routing configuration of an associated optical routing device 12 can be selectively determined after manufacture of the optical device blank 14. Therefore, the optical device blank 14 can be implemented in a highly scalable manner to implement programmable optical routing systems in an inexpensive and on-demand manner.

Figure 2:
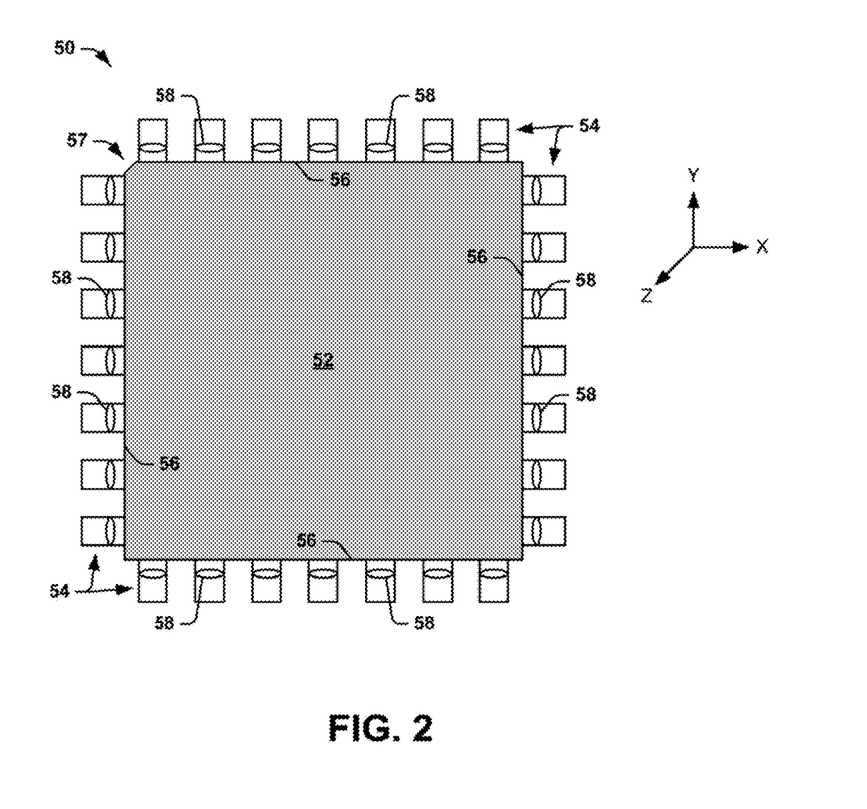
FIG. 2 illustrates an example of an optical device blank.

FIG. 2 illustrates an example of an optical device blank 50. The optical device blank 50 can correspond to the optical device blank(s) 14 in the example of FIG. 1. Thus, the optical device blank 50 can be a stock component that can be mass-producible to be selectively configured as an optical routing device (e.g., one of the optical routing device(s) 12) having any of a variety of predetermined optical routing configurations based on a laser-writing process.

The optical device blank 50 includes a body portion 52 and plurality of input/output (I/O) ports 54 that are arranged to extend outwardly from a plurality of peripheral (e.g., edge) surfaces 56. In some examples, as shown in FIG. 2, the I/O ports are provided at each of the peripheral surfaces 56. The body portion 52 can be a three-dimensional structure defined by a pair of spaced-apart parallel planar surfaces, demonstrated as rectangular planes (e.g., square planes, as demonstrated in the example of FIG. 2) in the XY-plane. The pair of parallel planar surfaces are separated by and bounded by the peripheral surfaces 56, such that the body portion 52 can be configured as a rectangular prism (e.g., having a square cross-section taken along the XY-plane). In the example of FIG. 2, the I/O ports 54 are demonstrated as having equal numbers and spacing with respect to each of the peripheral surfaces 56 along which they are arranged. Thus, the arrangement of the I/O ports 54 with respect to the body portion 52 is demonstrated as being symmetric about three orthogonal planes (e.g., XY-plane, YZ-plane, and XZ-plane) through a geometric center of the optical device blank 50 to provide complete versatility for optical routing. In the example of FIG. 2, the optical device blank 50 is demonstrated as keyed based on a bevel 57 having been formed in the body portion 52 to enable receipt into a mating receptacle, such as described herein.

The body portion 52 can be composed of a solid dielectric material that is optically transmissive and has a substantially constant index of refraction. As an example, the body portion 52 can be formed from a molded plastic material, glass, a dielectric oxide material, or a variety of other materials having a substantially constant index of refraction throughout. The body portion 52 can thus be fabricated using a variety of injection molding or other techniques that can provide for a very rapid and very inexpensive manner of mass producing a large quantity of optical device blanks 50.

As an example, the I/O ports 54 can be formed as part of the body portion 52 of the optical device blank 50. For example, the I/O ports 54 can correspond to mechanical optical connectors into which optical fibers can be plugged or to which optical fibers can be spliced. Thus, the body portion 52 can be fabricated (e.g., by machining) to include optical couplers on the peripheral surfaces 56 to which the I/O ports 54 can be coupled. As another example, the I/O ports 54 can be molded onto the body portion during an associated molding process to form the body portion 52. For example, the I/O ports 54 can be molded in a predetermined alignment that can correspond to a receptacle into which an optical routing device that is fabricated from the optical device blank 50 based on the laser-writing process can be received. Therefore, the location of the I/O ports 54 can provide optical coupling of optical systems that are optically coupled to the receptacle into which the blank may be inserted, such that optical signals can pass between the optical systems and one or more optical waveguides laser-written into the body portion 52, as described herein, via the optical coupling between the receptacle and the I/O ports 54.

As yet another example, the I/O ports 54 can correspond directly to a periphery of the material of the body portion 52, such that optical signals can coupled directly into the peripheral surfaces 56. For example, optical fibers associated with the I/O ports 54 can be separate from the body portion 52, such that the optical routing device that is fabricated from the optical device blank 50 can be snapped into the receptacle that is substantially flush with the I/O ports to provide optical signals directly to and from the peripheral surfaces 56 of the body portion 52. Thus, the I/O ports 56 can be fabricated in a variety of ways to optically couple optical signals to and from the optical waveguide(s) that are laser-written into the body portion 52.

In addition, in the example of FIG. 2, the I/O ports 54 each include a mode-coupling device 58 to couple optical signals between the body portion 52 and the I/O ports 54. For example, the mode-coupling devices 58 can be configured as lenses to focus optical signals into/out of respective optical waveguides that are formed in the body portion 52. As an example, the mode-coupling devices 58 can be part of the respective I/O ports 54 configured as mechanical connectors. As another example, the mode-coupling devices 58 can be formed as part of the body portion 52 (e.g., at the peripheral surfaces 56 of the body portion 52), or can be provided between the peripheral surfaces 56 of the body portion 52 and the I/O ports 54. Thus, based on the mode-coupling devices 58, optical signals can be mode-matched between the optical waveguides formed in the body portion 52 and the respective I/O ports 54.

It is to be understood that the optical device blank 50 is not limited to the example of FIG. 2. As an example, while the body portion 52 of the optical device blank 50 is demonstrated as a square prism, the body portion 52 can have any of a variety of three-dimensional shapes, such as having a cross-sectional shape that is triangular, hexagonal, or octagonal, having non-equal lengths of the peripheral surfaces 56 (e.g., in a rectangular prism), or a variety of other configurations. As another example, the optical device blank 50 is not limited to including I/O ports 54 on all of the peripheral surfaces 56, or having an equal number and/or spacing of I/O ports 54 on each of the peripheral surfaces 56.

Additionally, as described previously, the optical device blank 50 includes a key formed as a bevel 57 from a corner of the body portion 52 to enable only a single manner of mounting a respective optical routing device formed from the optical device blank 50 in a corresponding mating receptacle. While the keying is demonstrated as the bevel 57 in the example of FIG. 2, it is to be understood that other types of keying can be implemented, such as a notch, a ridge, or another structural feature formed on one or more of the peripheral surfaces 56 and/or the XY-plane parallel planar surfaces. Such a mating receptacle may include an associated material having a shape that corresponds to the bevel 57, and thus can be designed to structurally mate with the bevel 57. Additionally, different keyed configurations can be implemented for different optical device blanks designed for different applications (e.g., product specific keys). Furthermore, while the optical device blank 50 is demonstrated as including twenty-eight I/O ports 54 (e.g., seven on each of the peripheral surfaces 56), it is to be understood that the optical device blank 50 can included more or less I/O ports 54 than demonstrated in the example of FIG. 2. Accordingly, the optical device blank 50 can be configured in any of a variety of ways.

Referring back to the example of FIG. 1, the laser-writing device 16 includes a memory 18 that is configured to store one or more optical routing programs that are implemented by the laser-writing device 16 to laser-write optical waveguides in the optical device blank(s) 14, thereby generating the optical routing device(s) 12. As described herein, the term "laser-write" and derivatives thereof refer to a system or method of forming an optical waveguide in a material via a focused laser that is moved along a length of the material at a given depth of the material. Thus, the focused laser beam changes (e.g., increases) a refractive-index along the length of the material relative to the surrounding material to form an optical waveguide through which an optical signal can propagate. As described herein, the optical device blank(s) 14 can include a body portion (e.g., the body portion 52) that is formed of a solid material having a substantially constant refractive index throughout. Accordingly, the laser-writing device 16 can thus provide a focused laser beam into a depth of the material of the body portion (e.g., along the Z-axis of the body portion 52) and that is moved relative to the body portion (e.g., in the XY-plane of the optical device blank 50) to form an optical waveguide between at least one set of two I/O ports (e.g., one or more pairs of the I/O ports 54) of the optical device blank 14, thereby fabricating an associated optical routing device 12. For example, the movement of the focused laser beam relative to the optical device blank 14 can be based on servo motor controls or a variety of other manual or automatically controlled methods of moving the laser relative to the optical device blank 14.

In the example of FIG. 1, an optical routing program is demonstrated as provided to the memory 18 via a signal OPT_PRG. As an example, the signal OPT_PRG can represent a program being loaded into the memory 18 for storage via an input device (e.g., a user interface, external drive, external memory system, etc.) or via a network connection. Thus, one or more programs can be stored in the memory 18 and can be accessed to implement a predetermined laser-writing process to fabricate one or more optical routing devices 12 from the optical device blanks 14. For example, the signal OPT_PRG may include machine readable instructions to cause the laser writing device 16 to laser-write one or more optical waveguides within the body portion 52 between one or more pairs of the I/O ports 54 of the optical device blank 50 in the example of FIG. 2.

For example, the laser-writing device 16 can be configured to laser-write a plurality of the optical device blanks 14 into a respective plurality of substantially identical optical routing devices 12 based on a single program stored in the memory 18. The program that is stored in the memory 18 can be selectively modified, accessed, or rewritten to change the optical routing arrangement of a given set of one or more optical routing devices 12 from a given set of optical device blanks 14. As an example, the laser-writing device 16 can fabricate a first batch of substantially identical optical routing devices 12 via laser-writing one or more optical waveguides in a respective batch of optical device blanks 14 based on a first optical routing program that is stored in the memory 18. Subsequently, another optical routing program can be stored to the memory 18 (e.g., via the signal OPT_PRG) and/or be accessed from the memory 18 to fabricate a second batch of substantially identical optical routing devices 12 via laser-writing one or more optical waveguides in another respective batch of optical device blanks 14, with the second batch of optical routing devices 12 being different from the first batch of optical routing devices 12. Therefore, the arrangement of optical waveguides can be programmatically configured for fabricating a given set of optical routing devices 12 from a common set of substantially identical optical device blanks 14. In other words, the common set of substantially identical optical device blanks 14 can be unspecific to any routing arrangement provided in the resultant optical routing devices 12.

Figure 3:
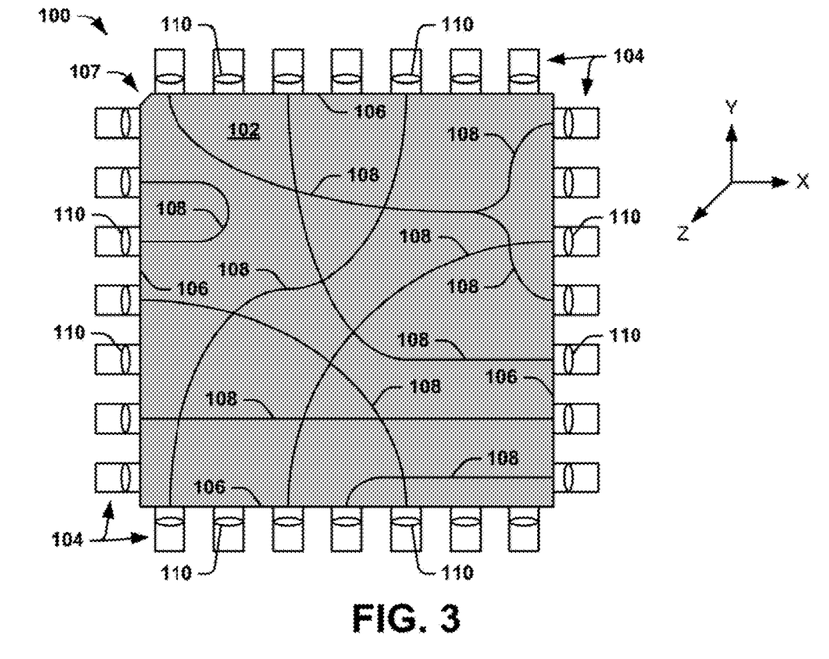
FIG. 3 illustrates an example of an optical routing device.

FIG. 3 illustrates an example of an optical routing device 100. The optical routing device 100 can be configured in any of a variety of optical communications and computer applications that require optical signal transfer. The optical routing device 100 is configured to route optical signals between sets of I/O ports via respective optical waveguides. The optical routing device 100 can thus provide optical routing or optical shuffling of optical signals between respective ports based on the configuration of the optical waveguides that were formed in the optical routing device via a laser-writing process. As an example, the optical routing device 100 can be formed from an optical device blank, such as the optical device blank 50 in the example of FIG. 2, that has undergone the laser-writing process (e.g., via the laser-writing device 16 programmed as disclosed in the example of FIG. 1) to form the optical routing device 100.

The optical routing device 100 includes a body portion 102 and plurality of input/output (I/O) ports 104 that are arranged at a plurality of peripheral surfaces 106. Based on the laser-writing procedure, the body portion 102 can have a plurality of optical waveguides 108 formed therein. The optical waveguides 108 can extend in a variety of non-linear or linear paths between any two or more of the I/O ports 104. The optical waveguides 108 can extend from one of the peripheral surfaces 106 to any other of the peripheral surfaces 106, or to an I/O port 104 on the same peripheral surface 106. Additionally, similar to as described previously in the example of FIG. 2, the optical routing device 100 includes a key formed as a bevel 107 from a corner of the body portion 102 to enable only a single manner of mounting the optical routing device 100 in a corresponding mating receptacle.

As an example, one or more of the optical waveguides 108 can couple two of the I/O ports 104. In another example, one or more of the optical waveguides 108 can be split to couple one of the I/O ports 104 to two or more other of the I/O ports 104. Additionally, overlapping of optical waveguides 108 in the XY-plane can occur based on varying the laser-writing depth along the Z-axis as to provide overlapping but non-intersecting optical waveguides. For example, at least a portion of the optical waveguides are arranged at a different depth between the parallel planar surfaces defined by the XY-plane between and around which the peripheral surfaces 106 are arranged. Furthermore, the optical routing device 100 can include any number of optical waveguides 108 formed in the body portion 102 between the I/O ports 104, as defined by the associated program stored in the memory 18 of the laser-writing device 16 in the example of FIG. 1 and implemented during the laser-writing process. For example, the optical routing device 100 can include optical waveguides 108 that can collectively extend between all of the I/O ports 104, or can include only a single waveguide 108 that extends between two of the I/O ports 104, or can include any number of I/O ports in-between.

In addition, similar to the example optical device blank 50 as described in the example of FIG. 2, the I/O ports 104 each include a mode-coupling device 110 to couple optical signals between the body portion 102 and the I/O ports 104. For example, the mode-coupling devices 110 can be configured as lenses to focus optical signals into/out of the respective optical waveguides 108 that are formed in the body portion 102. As an example, the mode-coupling devices 110 can be part of the respective I/O ports 104 configured as mechanical connectors. As another example, the mode-coupling devices 110 can be formed as part of the body portion 102 (e.g., at the peripheral surfaces 106 of the body portion 102), or can be provided between the peripheral surfaces 106 of the body portion 102 and the I/O ports 104. Thus, based on the mode-coupling devices 110, optical signals can be mode-matched between the optical waveguides 108 and the respective I/O ports 104.

Figure 4:
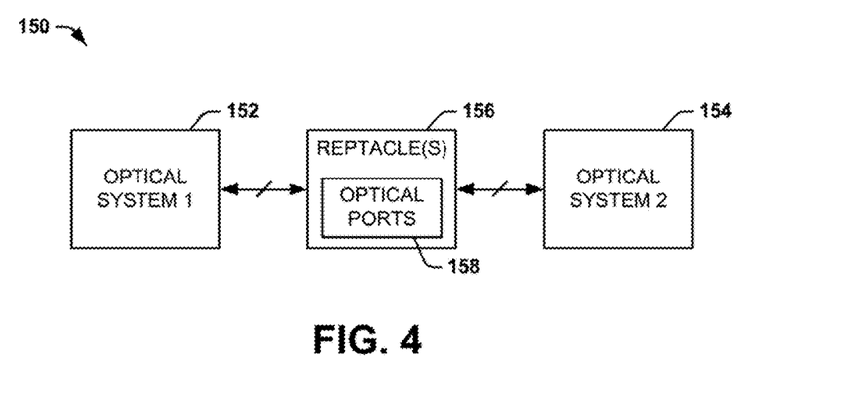
FIG. 4 illustrates an example of an optical routing system.

FIG. 4 illustrates an example of an optical routing system 150. The optical routing system 150 can be implemented in any of a variety of optical communications and computer applications that require optical signal transfer. The optical routing system 150 includes a first optical system 152, a second optical system 154, and at least one receptacle 156. The first and second optical systems 152 and 154 can correspond to any of a variety of optical communications equipment, such as including laser(s), electro-optic modulators and demodulators, electronic circuits, memory, photodiodes, or a variety of other communications, computing, and/or electronic components. As an example, the optical routing system 150 can include the receptacle(s) 156 only, such as to facilitate optical coupling to the optical systems 152 and 154, and can include predetermined optical waveguides (e.g., optical fibers or other types of waveguides) that are coupled to the receptacle(s) 156 to facilitate optical coupling of the configurable optical systems 152 and 154 to the receptacle(s) 156.

The receptacle(s) 156 can each be configured to facilitate receipt of and removal of an optical routing device that is fabricated from a laser-writing process, such as described herein. For example, the receptacle(s) 156 can be configured to receive one or more optical routing devices 100, as demonstrated in the example of FIG. 3, with each of the optical routing devices 100 having the same or a different arrangement of optical waveguides 108 with respect to each other. In the example of FIG. 4, the receptacle(s) 156 each include a plurality of optical ports 158 that are optically coupled with one or both of the optical systems 152 and 154. As an example, the optical ports 158 can be arranged at a periphery of each of the receptacle(s) 156, such as to provide optical connectivity to corresponding ports 104 of an optical routing device 100 that is received in the respective receptacle(s) 156. Therefore, upon receipt of an optical routing device in a respective one of the receptacle(s) 156, the optical ports 158 can provide optical connectivity of the first optical system 152 with the second optical system 154 via the optical waveguides of the optical routing device received in the respective receptacle(s) 156.

As an example, the receptacle(s) 156 can correspond to a fitted bracket into which the respective optical routing device(s) can be snapped into place, or can include mechanical coupling means (e.g., screws, bolts, pegs, or a variety of other types of fittings) to secure the mounting of the respective optical routing device(s) into the receptacle(s) 156. In addition, as described previously, the receptacle(s) 156 can be keyed, such as based on a shape of the periphery of the receptacle(s) 156 or based on a location of the mechanical coupling means, to facilitate a predetermined orientation of the respective corresponding optical routing device. Furthermore, the receptacle(s) 156 can be configured to allow for subsequent removal of the optical routing device, such that the receptacle(s) 156 can be configured to receive a different optical routing device after installation of an initial optical routing device. Accordingly, the optical routing system 150 can be subsequently reprogrammable or field retrofit-capable, such as based on desired changes to the configuration of the optical systems 152 and 154 or other associated systems.

The optical ports 158 in a given receptacle 156 can be substantially aligned with the arrangement of I/O ports in an optical device blank (e.g., ports 54 of the optical device blank 50 in the example of FIG. 2). As an example, the optical ports 158 can have an arrangement and a quantity that substantially matches the arrangement and quantity of the I/O ports (e.g., the I/O ports 54) of the optical device blank. As described previously, the optical ports 158 can also be optically coupled to at least one of the first and second optical systems 152 and 154. Additionally or alternatively, some of the optical ports 158 can provide optical connectivity between different respective ones of the receptacles 156. Therefore, the optical ports 158 can facilitate optical coupling between the first optical system 152 and the second optical system 154 via the optical waveguides of one or more optical routing devices mounted in a respective one or more of the receptacle(s) 156 based on the programmable routing arrangement of each of the optical routing devices (e.g., devices 100 of FIG. 3) received in the receptacle(s) 156.

Figure 5:
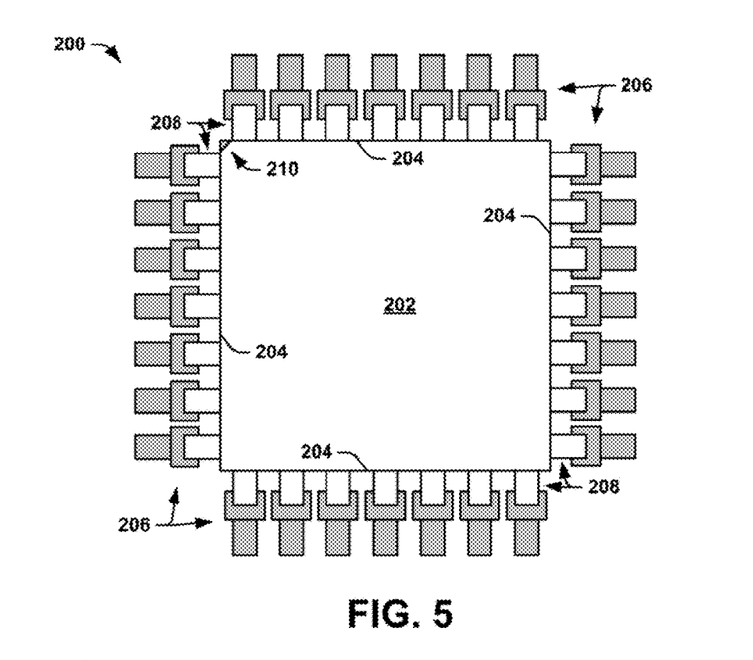
FIG. 5 illustrates an example of a receptacle in an optical routing system.

FIG. 5 illustrates an example of a receptacle 200 in an optical routing system (e.g., the optical routing system 150). The receptacle 200 is dimensioned and configured to enable receipt of and removal of an optical routing device (e.g., the optical routing device 100) that has been fabricated from a laser-writing process, such as described herein. In the example of FIG. 5, the receptacle 200 is defined by a volume 202 that is surrounded by peripheral sidewalls 204 that are dimensioned to receive an optical routing device (e.g., the optical routing device 100 in the example of FIG. 3). For example, the peripheral sidewalls 204 can have a depth dimension to receive the thickness of the optical routing device.

The receptacle 200 also includes a plurality of optical ports 206 that are coupled to I/O port receptacles 208 that are arranged at the peripheral sidewalls 204. The I/O port receptacles 208 can be dimensioned to receive I/O ports along with receipt of the body portion of the corresponding optical routing device within the volume 202. The optical ports 206 can be implemented to facilitate optically coupling with a variety of optical systems (e.g., the optical systems 152 and 154). For example, the optical ports 206 can be configured as optical fiber plugs, feed-throughs, or can be coupled to static optical waveguides to which optical systems can be coupled. In the example of FIG. 5, the optical ports 206 are arranged as coupled to the I/O port receptacles 208 of the receptacle 200, such as to provide optical connectivity to corresponding I/O ports (e.g., the I/O ports 104) of the optical routing device (e.g., the optical routing device 100) that is received in the receptacle 200.

As an example, the optical ports 206 in the receptacle 200 can be elevated relative to depth of the peripheral sidewalls 204. Therefore, the optical ports 206 can be substantially aligned with the arrangement of I/O ports in an optical routing device (e.g., the optical routing device 100 in the example of FIG. 3) that is fabricated from an optical device blank (e.g., the optical device blank 50 in the example of FIG. 2). As an example, the optical ports 206 can have an arrangement and a quantity that substantially matches the arrangement and quantity of the I/O ports (e.g., the I/O ports 104) of the optical device blank. Therefore, regardless of the optical routing arrangement of the optical routing device received in the receptacle 200 (e.g., regardless of the number and connection of optical waveguides in the optical routing device), the receptacle 200 can provide optical connectivity to all of the I/O ports (e.g., the I/O ports 104) of the optical routing device received therein. As an example, upon receipt of the respective optical routing device that has been fabricated from a respective optical device blank, the I/O ports of the optical routing device can be provided as substantially flush with the optical ports 206, such as to provide optical coupling between the I/O ports of the optical routing device and the optical ports 206 without any additional mechanical connection or coupling therebetween.

Additionally, as described previously, the receptacle 200 includes a corresponding key, demonstrated as a triangular mass 210 at the corner of the volume 202. An optical routing device to be received in the receptacle 200 can thus have a corresponding key structure (e.g., the bevel 107), such as based on the manufacture of the respective optical device blank implemented to fabricate the optical routing device (e.g., the bevel 57 of the optical device blank 50), to enforce a predetermined orientation of the respective corresponding optical routing device. As an example, instead of the triangular mass 210, the receptacle 200 can include a variety of other types of keying, such as based on a shape of the peripheral sidewalls 204 of the receptacle 200 or based on a location of a mechanical coupling means (e.g., in the volume 202). Furthermore, the receptacle 200 can be configured to allow for subsequent removal of the optical routing device. For example, the receptacle 200 can have a fitted spring bracket coupling means to snap the optical routing device in place, or can include mechanical fastening means (e.g., screws, bolts, pins, etc.). Therefore, the receptacle 200 can be configured to receive a different optical routing device after installation of an initial optical routing device to facilitate flexibility and a capability to reconfigure associated optical systems.

Figure 6:
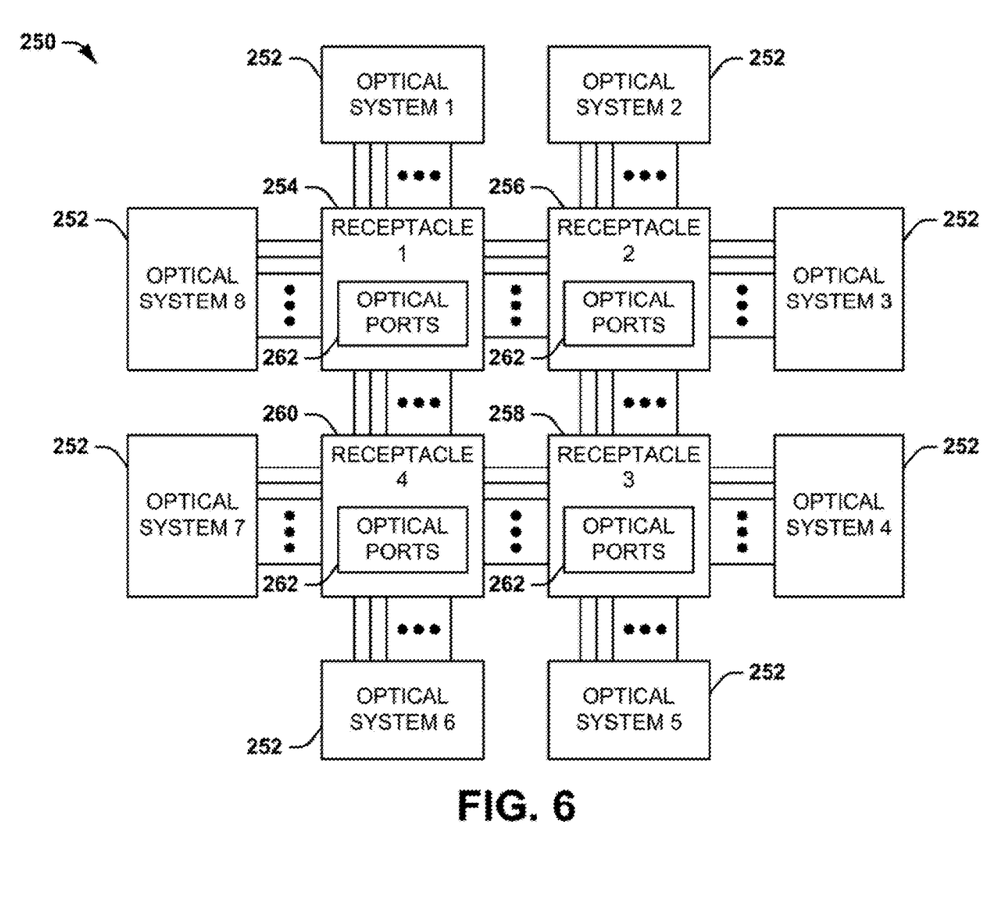
FIG. 6 illustrates another example of an optical routing system.

FIG. 6 illustrates another example of an optical routing system 250. The optical routing system 250 can be implemented in any of a variety of optical communications and computer applications that require optical signal transfer. The optical routing system 250 includes a plurality of optical systems 252, demonstrated as eight optical systems 252 in the example of FIG. 6, and a plurality of receptacles, demonstrated as a first receptacle 254, a second receptacle 256, a third receptacle 258, and a fourth receptacle 260. Other numbers of optical systems and receptacles could be implemented in an optical routing system than that demonstrated in the example of FIG. 6. The optical systems 252 can correspond to any of a variety of optical communications equipment, such as including laser(s), electro-optic modulators and demodulators, electronic circuits, memory, photodiodes, or a variety of other communications, computing, and/or electronic components. As an example, the optical routing system 250 can include the receptacles 254, 256, 258, and 260, such as to facilitate optical coupling to the optical systems 252, and can include predetermined optical waveguides (e.g., optical fibers or other types of waveguides) that are coupled to the receptacles 254, 256, 258, and 260 to facilitate optical coupling of the configurable optical systems 252 to the receptacles 254, 256, 258, and 260.

The receptacles 254, 256, 258, and 260 can each be configured to facilitate receipt of and removal of respective optical routing devices that are each fabricated from a laser-writing process, such as described herein. For example, the receptacles 254, 256, 258, and 260 can each be configured to receive a respective optical routing device 100 in the example of FIG. 3, with each of the optical routing devices 100 having the same or a different arrangement of optical waveguides 108 with respect to each other.

In the example of FIG. 6, the receptacles 254, 256, 258, and 260 each include a plurality of optical ports 262. The optical ports 262 of the first receptacle 254 provide optical connectivity of the first receptacle 254 with a pair of the optical systems 252 (OPTICAL SYSTEM 1 and 8), the second receptacle 256, and the fourth receptacle 260. The optical ports 262 of the second receptacle 256 provide optical connectivity of the second receptacle 256 with a pair of the optical systems 252 (OPTICAL SYSTEM 2 and 3), the first receptacle 254, and the third receptacle 258. The optical ports 262 of the third receptacle 258 provide optical connectivity of the third receptacle 258 with a pair of the optical systems 252 (OPTICAL SYSTEM 4 and 5), the second receptacle 256, and the fourth receptacle 260. The optical ports 262 of the fourth receptacle 260 provide optical connectivity of the fourth receptacle 260 with a pair of the optical systems 252 (OPTICAL SYSTEM 6 and 7), the first receptacle 254, and the third receptacle 258.

For example, the optical ports 262 can be configured as optical fiber plugs, feed-throughs, or can be coupled to static optical waveguides to provide a plurality of separate optical connections throughout the optical routing system 250. Therefore, as described herein, based on the optical ports 262, each of the receptacles 254, 256, 258, and 260 can receive a respective optical routing system to provide any arrangement of optical connectivity between any two or more of the optical systems 252 in a programmable manner. For example, based on the programmable optical routing arrangement of the respective optical routing devices mounted in two or more of the receptacles 254, 256, 258, and 260, the optical routing system 250 can route an optical signal from one of the optical systems 252, through one or more of the optical routing devices received in the respective receptacles 254, 256, 258, and 260, to any other of the optical systems 252 via the respective optical ports 262, the I/O ports of the respective optical routing devices, and through respective optical waveguides that have been laser-written into the body portion of the respective optical routing devices received therein.

Accordingly, the optical routing system 250 can provide a programmable manner of optical routing between any of the optical systems 252. Additionally, the receptacles 254, 256, 258, and 260 can each be configured to allow for subsequent removal of the respective optical routing devices, such that the receptacles 254, 256, 258, and 260 can be configured to receive different optical routing devices after installation of initial optical routing devices. Accordingly, the optical routing system 250 can be subsequently reprogrammable or field retrofittable, such as based on desired changes to the configuration of the optical systems 252 or other associated systems.

Figure 7:
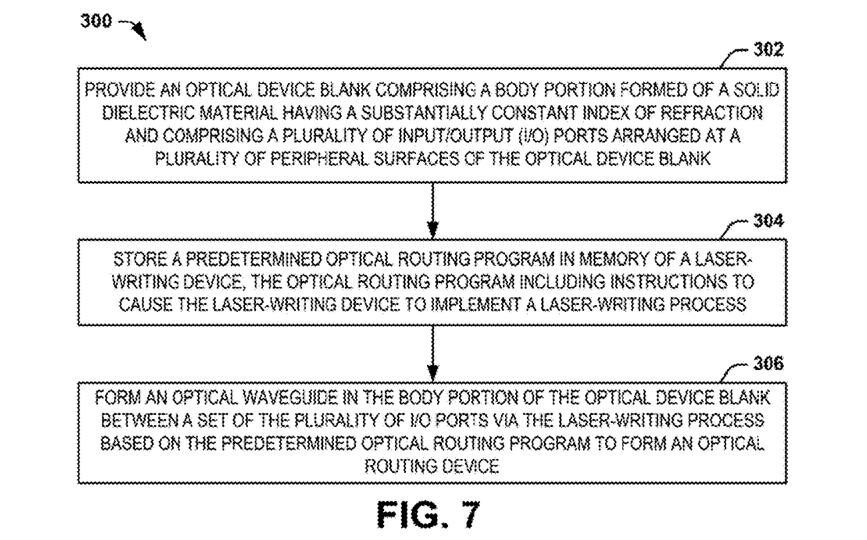
FIG. 7 illustrates an example of a method for fabricating an optical routing device.

In view of the foregoing structural and functional features described above, an example methodology will be better appreciated with reference to FIG. 7. While, for purposes of simplicity of explanation, the methodology of FIG. 7 is shown and described as executing serially, it is to be understood and appreciated that the present invention is not limited by the illustrated order, as some embodiments could in other embodiments occur in different orders and/or concurrently from that shown and described herein.

FIG. 7 illustrates an example of a method 300 method for fabricating an optical routing device (e.g., the optical routing device 100). At 302, an optical device blank (e.g., the optical device blank 50) comprising a body portion (e.g., the body portion 52) formed of a solid dielectric material having a substantially constant index of refraction and comprising a plurality of input/output (I/O) ports (e.g., the I/O ports 54) arranged at a plurality of peripheral surfaces (e.g., the peripheral surfaces 56) of the optical device blank is provided. At 304, a predetermined optical routing program (e.g., the signal OPT_PRG stored in the memory 18) is provided to a laser-writing device (e.g., the laser-writing device 16) to implement a laser-writing process. At 306, an optical waveguide (e.g., an optical waveguide 108) is selectively formed in the body portion of the optical device blank between a set of the plurality of I/O ports via the laser-writing process based on the predetermined optical routing program to provide the optical routing device.

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. An optical routing system comprising:
a receptacle that is dimensioned to facilitate receipt of and removal of an optical routing device, the optical routing device comprising:
a plurality of input/output (I/O) ports and a body portion, the plurality of I/O ports being arranged at a plurality of peripheral surfaces of the body portion, the body portion comprising a solid dielectric material having a substantially constant index of refraction, the body portion also comprising parallel planar surfaces spaced apart by and bounded by the plurality of peripheral surfaces, the solid dielectric material in the body portion being writable via a laser-writing process to form at least one optical waveguide extending between a set of the plurality of I/O ports,
and the receptacle including the at least one optical waveguide between a respective set of the plurality of I/O ports, wherein the receptacle comprises a plurality of optical ports that are optically coupled with each of the plurality of I/O ports of the optical routing device when the optical routing device is received in the receptacle to enable propagation of an optical signal through the at least one optical waveguide.

2. The optical routing system of claim 1, wherein a respective portion of the plurality of I/O ports is arranged on each of the plurality peripheral surfaces.

3. The optical routing system of claim 1, wherein each of the plurality of I/O ports comprises a mode-coupling device.

4. The optical routing system of claim 1, wherein each of the parallel planar surfaces are rectangular-shaped, and wherein each of the plurality of peripheral surfaces comprises an arrangement of the plurality of I/O ports having a quantity and spatial distribution that are approximately equal relative to an opposite one of the plurality of peripheral surfaces, such that the apparatus is symmetric about three orthogonal axes intersecting at a geometric center.

5. The optical routing system of claim 1, wherein the body portion is keyed to facilitate receipt by a receptacle in a predetermined orientation.

6. An optical routing system comprising:
an optical routing device that comprises an optical waveguide formed within a body portion of a corresponding optical device blank via a laser-writing process between a set of a plurality of input/output (I/O) ports arranged at a plurality of peripheral surfaces of the optical device blank, the body portion of the optical device blank being formed of a solid dielectric material having a substantially constant index of refraction; and
a receptacle that is facilitated to optically couple to a plurality of optical systems, the receptacle being dimensioned to facilitate receipt of and removal of the optical routing device therein, the receptacle comprising a plurality of optical ports to optically couple with each of the plurality of I/O ports of the optical routing device when the optical routing device is mounted in the receptacle to enable propagation of an optical signal through the optical waveguide.

* * * * *